United States Patent [19]

Ward

[11] 4,293,980
[45] Oct. 13, 1981

[54] METHOD FOR WASHING ANIMAL CASINGS

[75] Inventor: Roderick O. Ward, Havelock North, New Zealand

[73] Assignee: W & R Fletcher (N.Z.) Limited, Wellington, New Zealand

[21] Appl. No.: 49,804

[22] Filed: Jun. 18, 1979

[30] Foreign Application Priority Data

Jun. 30, 1978 [NZ] New Zealand .......................... 187739

[51] Int. Cl.³ ............................................... A22B 5/18
[52] U.S. Cl. ........................................... 17/51; 17/43
[58] Field of Search ........................................ 17/43, 51

[56] References Cited

U.S. PATENT DOCUMENTS

| | | | |
|---|---|---|---|
| 1,484,741 | 2/1924 | Schonland, Jr. | 17/51 X |
| 2,701,386 | 2/1955 | Strickler | 17/43 X |
| 2,795,817 | 6/1957 | Dahlberg | 17/51 |
| 3,175,244 | 3/1965 | Sharp et al. | 17/51 X |
| 3,590,421 | 7/1971 | Loth et al. | 17/43 X |

Primary Examiner—Willie G. Abercrombie
Attorney, Agent, or Firm—Holman & Stern

[57] ABSTRACT

There is disclosed a method of mechanically washing an animal casing such as a bung. The method involves placing the casing on an elongate support element so that the element extends through the casing, the element having a duct or ducts for washing liquid and outlets for discharging the liquid inside the casing. With the casing in place, washing liquid can be caused to issue from the outlets under pressure so as to wash the interior of the casing. There is also disclosed a machine for washing such casings, the machine essentially consisting of a number of such elements which can be loaded with casings in a loading zone, a supply means for supplying washing liquid to the ducts of the elements in a washing zone, and a transport means for transporting the elements in rotation between and through these zones.

11 Claims, 3 Drawing Figures

METHOD FOR WASHING ANIMAL CASINGS

BRIEF SUMMARY OF THE INVENTION

The present invention relates to a method of and a machine for washing animal casings such as bungs.

Conveniently, washing of animal bungs is carried out entirely manually with a variety of different steps involved. For example, a gut set consisting of a bung with attached crown is placed on a cutting board and the bung is separated from the crown and cut to a desired length, the crown being placed in a chute for removal. The bung is then placed over a vertical water nozzle of a washing device and agitated while water is discharged from the nozzle to wash the bung. The water supply is then discontinued and the washed bung placed in a further chute for removal. This process is laborious and time-consuming, with scope for varying degrees of quality in the washing of the bungs.

The present invention therefore has as its principal object the provision of a method and a machine which will enable washing of an animal casing such as a bung to be carried out mechanically, in particular in a fashion that in an embodiment of the invention will allow processing of a quantity of such casings on a production-line basis.

Other objects and advantages of the invention will be apparent from the following description.

In accordance with a first aspect of the present invention there is provided a method of mechanically washing an animal casing such as a bung, the method comprising the steps of placing the casing on an elongate support element so that the element extends through the interior of the casing, the element including duct means for washing liquid and outlet means for the discharge of such liquid in the interior of the casing, and causing washing liquid to issue under pressure from the outlet means thereby to wash the interior of the casing.

Preferably, the washing liquid issues from the outlet means in jets, such jets preferably being so directed against the interior surface of the casing as to rotate the casing around the element.

The method may comprise the further step of removing the casing from the element after being washed. Expediently, the removal of the washed casing is carried out in such a manner as to turn the casing inside out during removal. This may be achieved by applying suction to an end portion of the casing to hold that portion stationary relative to the element and then drawing the rest of the casing over the held portion.

The method may further comprise the preliminary step of cutting the casing to a predetermined length prior to being placed on the element.

The method may advantageously be employed for the continuous washing of casings, the casings being washed in succession by the procedure already described and each casing being placed on a respective support element. Preferably, washing liquid is supplied to the duct means of the elements in succession, for example by moving the elements in succession through a washing zone and supplying washing liquid to the duct means of each element while in the washing zone.

In accordance with a second aspect of the present invention there is provided a machine for washing animal casings such as bungs, the machine comprising a plurality of elongate support elements each for engagement thereon, in a loading zone of the machine, of an animal casing in such a manner that the element extends through the interior of the casing, each of the elements having duct means for washing liquid and outlet means for the discharge of such liquid in the interior of a casing engaged on the element, supply means for supplying washing liquid to the duct means of the elements in a washing zone of the machine, and transport means drivable to transport the elements in rotation between and through the zones.

Preferably, the outlet means of each element comprises a plurality of outlet passages, which for preference are so arranged that washing liquid issuing therefrom under pressure and impinging on the interior surface of a casing engaged on the element will tend to rotate the casing around the element. The outlet passages are preferably arranged at intervals along the length of each element and preferably also at intervals around the circumference of each element. Each element is preferably substantially tubular in shape, the duct means being defined by the central bore of the tube and the outlet means comprising openings in the wall of the tube.

The transport means preferably comprises a rotatable hub with the support elements radiating therefrom, the loading and washing zones being defined by respective segments of the circular path travelled by the elements on rotation of the hub. The elements are for preference directed at an angle upwardly from the hub, so as to facilitate placing of the casings on the elements and also retention of the casings when so placed. The transport means may also include drive means operable to rotate the hub.

With this form of transport means the loading and washing zones, and any other zones designated for similar purposes, are in effect angularly spaced around the hub axis. It is also possible, however, for the transport means to provide a different form of movement, for example circulating movement as provided by a conveyor, in which case the various zones may have a linearly spaced or other suitable relationship.

The supply means for the washing liquid expediently comprises a conduit communicating with the duct means of each element when and only when that element is in the washing zone. Preferably, the supply means comprises a stationary head provided with a passage defining said conduit, the passage having an outlet extending around part of the circumference of the head so as to be in communication with the duct means of each element during movement thereof through the washing zone.

For preference, the machine further comprises removing means for removing washed casings from the elements in a discharge zone. The removing means preferably comprises an endless belt which in use is engageable with the washed casings on each element and which is operable to frictionally drive the casings off that element.

In addition, there may be provided suction means for applying suction to so hold an end portion of each washed casing stationary relative to the respective element that the casing is turned inside out during removal from the element. The suction means preferably comprises a suction duct in each element, the suction duct having a port at the outer circumference of the element, and a further suction duct which is connectible to a source of suction and which communicates with the suction duct of each element when and only when that element is in the discharge zone.

The machine may further include a cutting table in the loading zone, the cutting table serving for the cutting of the casings prior to engagement on the elements. A further feature of the machine in a preferred embodiment thereof is a sump arranged below the elements for collection of washing liquid and waste material from the casings.

BRIEF DESCRIPTION OF THE SEVERAL VIEWS OF THE DRAWING

An embodiment of the invention will now be more particularly described by way of example with reference to the accompanying drawings, in which:-

Figure 1:
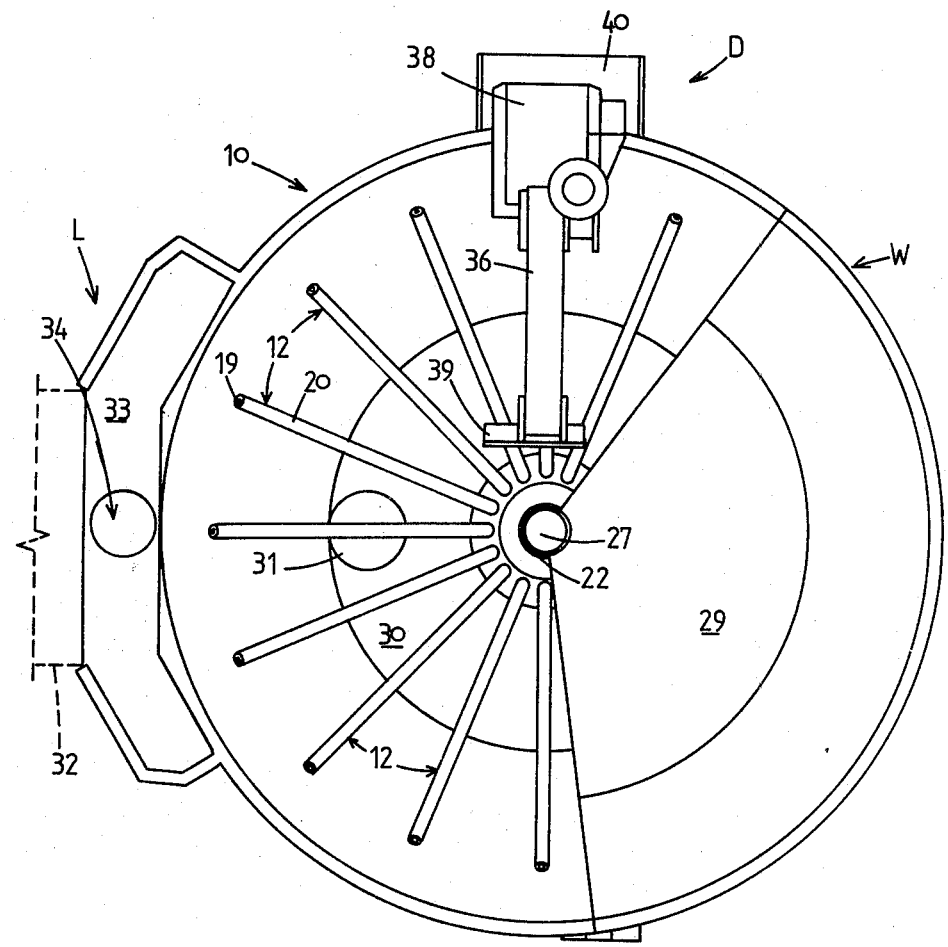
FIG. 1 is a schematic plan view of a bung washing machine according to the said embodiment.

Referring now to the drawings, there is shown a machine 10 for mechanical washing of animal bungs, for example sheep bungs. The machine 10 comprises a rotatable transport unit which essentially consists of a hub 11 on which is mounted a plurality of tubular support elements 12 for carrying bungs—fitted on the elements in the manner of sleeves—through and between, in sequence, a loading zone L, a washing zone W and a discharge zone D.

The hub 11 is mounted on a flange 13 at the upper end of an output shaft of a drive unit 14, which in turn is mounted near the base of a machine frame 15 also supporting other parts of the machine. The drive unit 14 consists of an electric motor geared to drive the transport unit at approximately one revolution per minute.

Figure 3:
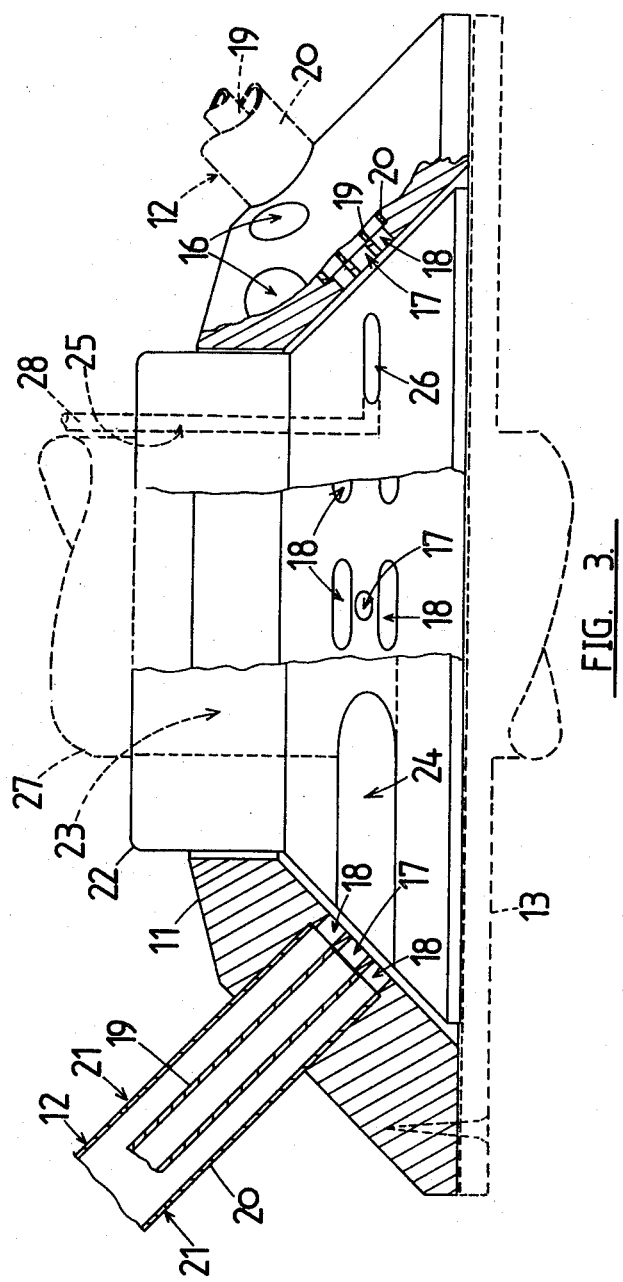
FIG. 3 is a partly sectioned elevation, to an enlarged scale, of the region A of FIG. 2.

The construction of the hub 11 can be seen more clearly in the partly sectioned view of FIG. 3, the hub consisting of a hollow frustro-conical member provided in its wall with a plurality of equidistantly spaced bores which extend upwardly at an angle to the axis of rotation of the hub. Each of the bores is formed as a socket portion 16 receiving a respective one of the support elements 12 and a duct portion divided into a central vacuum port 17 and a pair of flattened-oval section water ports 18.

Each of the elements 12 consists of an inner tube 19 communicating with the vacuum port 17 of the respective bore in the hub 11 and a concentric outer tube 20, the interior of which—apart from the tube 19—communicates with the pair of water ports 18 of that bore. The tube 20 is provided along its length and around its circumference with a plurality of regularly spaced, and for example helically arranged, water outlet passages 21. In cross-section of the tube 20, each of the passages 21 extends at an angle of approximately 15° to the tube radius, so that jets of water issuing from the passages 21 will impinge at corresponding angles against the interior surface of a bung engaged on the respective element.

The tube 19 has its outlet arranged so that suction can be applied at the outer circumference of the free end of the tube 20 to hold the adjacent portion of the bung against the tube 20.

The hub 11 houses a stationary head 22 of a supply means for supplying both washing water to the ports 17 and 18 and suction to the ports 17 of the hub. As can be seen in FIG. 3, the head 22 includes a water duct 23 which terminates in a flattened-oval section outlet 24 extending for an angle of approximately 75° around the circumference of the head in line with the water ports 18 of the hub 11, the head 22 being so arranged that the outlet 24 lies in the washing zone W. The angular extent of the outlet 24 in fact determines the angular extent of this zone. The head 22 also includes a vacuum duct 25 which terminates in a flattened-oval section port 26 extending for an angle of approximately 55° around the circumference of the head, the adjacent ends of the outlets 24 and 26 being angularly spaced by approximately 36°. The port 26 is in line with the vacuum ports 17 of the hub 11 and lies in the discharge zone D of the machine.

It will be noted that the width of the outlet 24 is such that it encompasses the vacuum ports 17 as well as the water ports 18, water thus being supplied by the outlet 24 to all of these ports whereas the port 26 supplies suction only to the vacuum ports 17. It will also be appreciated that in the region of the ports 17 and 18 and the outlets 24 and 26, the hub 11 and head 22 have mating surfaces which, although an exaggerated clearance is shown in FIG. 3, cooperate to interrupt the supply of water or suction, as the case may be, between successive ones of the ports 17 or successive pairs of the ports 18.

The head 22 is suspended from a vertical water pipe 27 connected to a source of water supply, the pipe 27 communicating with the water duct 23. Adjacent the pipe 27 there is arranged a smaller pipe 28 communicating with the vacuum duct 25, the pipe 28 being connected to a source of suction.

The water pipe 27 supports a cover 29 arranged over the washing zone W to confine the spray of the washing water to this region. Below the transport unit for the bungs there is arranged a bowl-shaped sump 30 for the collection of washing water and waste material from washed bungs, the sump 30 having a drain 31 in its base.

In the loading zone L there is provided a feed chute 32 and a cutting table 33 where gut sets—consisting of bungs with attached crowns—fed from the chute are cut prior to loading on the elements 12. In the centre of the cutting table 33 there is arranged a chute 34 for disposal of crowns severed from bungs, while above the cutting table are disposed spray washers (not shown) for cleansing of the table. The spray washers are supported by the water pipe 27.

Figure 2:
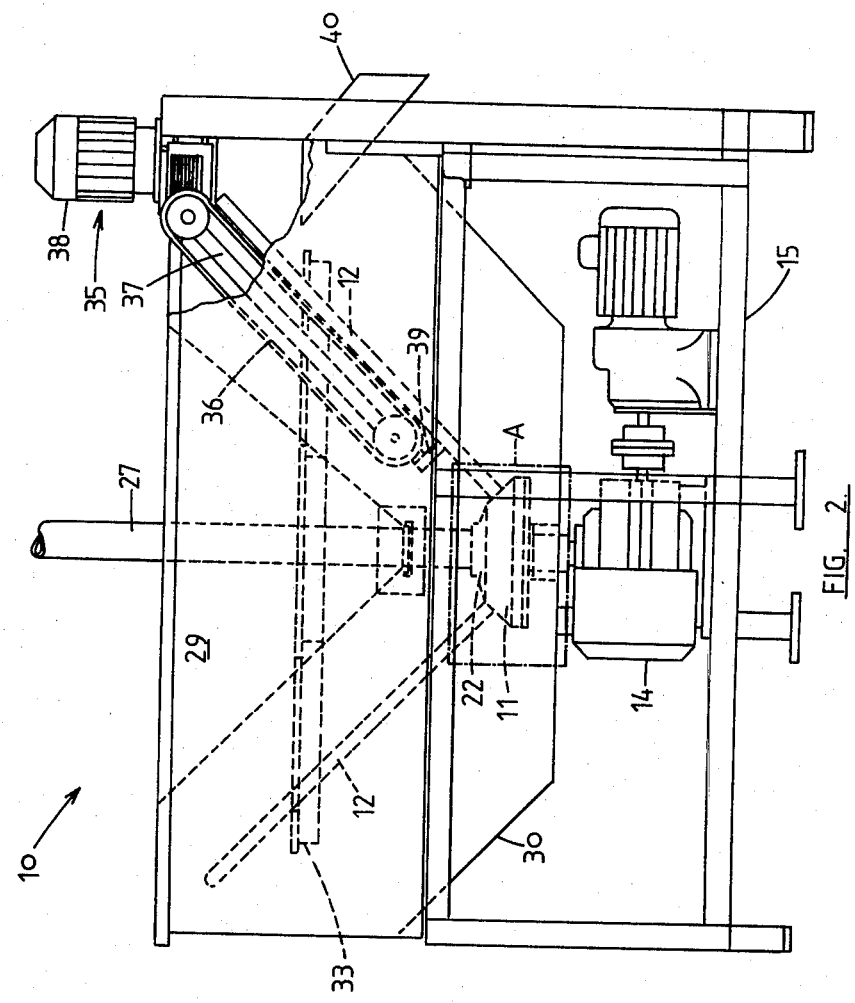
FIG. 2 is a schematic side elevation of the machine of FIG. 1.

In the discharge zone D there is arranged a removal unit 35 mounted on the frame 15 and operable to remove washed bungs from the elements 12. The removal unit 35 essentially consists of an endless belt 36 mounted on rollers carried by a frame 37, the upper roller being driven by an electric motor 38. The frame 37 is hingedly mounted at its upper end to the motor 38 and is supported at its lower end by a shoe 39 resting on the elements 12. The lower run of the belt 36 is engageable with bungs engaged on the elements and is driven in a counter-clockwise direction, as viewed in FIG. 2, to frictionally drive the bungs off the elements 12. The hinged mounting of the frame 37 allows compensation for any variations in height or angle of the elements 12.

A discharge chute 40 is positioned below the belt 36 for reception of bungs removed from the elements 12.

In operation of the machine 10, gut sets are fed down the feed chute 32 to the cutting table 33, where an operator severs the crown from the tubular bung of each set and at the same time cuts the bung to a desired length. The severed crowns are disposed of down the chute 34.

With the transport unit in slow rotation—in plan view, in a counter-clockwise direction in the illustrated embodiment—individual bungs are loosely slid in the manner of sleeves onto successive ones of the support elements 12, the bungs being free to rotate on the elements. Continuing rotation of the transport unit brings the bungs one after another into the washing zone W, at the commencement of which the interior passages of the tubes 19 and 20 of each element 12 are brought into communication, via the associated vacuum and water ports 17 and 18 of the hub 11, with the water outlet 24 of the head 22. Water supplied through the water pipe 27 and the water duct 23 in the head 22 thus flows through the outlet 24 and ports 17 and 18 into the tubes 19 and 20, eventually to issue as jets from the outlet passages 21 in the latter tube. The aforesaid 15° inclination of these passages causes the jets to impinge against the surrounding interior surface of the bung in such a manner as to impart torque to the bung and thus cause the bung to rotate around the element 12. The movement of the bung coupled with the action of the water jets ensures a particularly effective internal cleansing of the bung, and in this connection it is a particularly advantageous feature of the machine that movement of the bungs for enhanced cleaning effect is achieved without participation by an operative and without provision of a specific mechanism for rotating the bungs.

The washing of each bung in the washing zone W continues for as long as the outlet 24 of the head 22 remains in communication with the ports 17 and 18 associated with the element 12 carrying the bung, that is for 75° of each rotational cycle of the transport unit, after which the co-operable mating surfaces of the hub 11 and head 22 interrupt the water transfer therebetween. Waste water with entrained material washed from the bung is collected in the sump 30 and discharged through the drain 31.

Continuing rotation of the transport unit then brings the washed bungs one after another into the discharge zone D and into the range of the lower run of the endless belt 36 of the removal unit 35. At this stage the inner tube 19 of each element 12 as it comes into the zone D is placed in communication, via the associated vacuum port 17 in the hub 11, with the vacuum port 26 of the head 22, so that suction induced in the pipe 28 and the vacuum duct 25 of the head is applied at the outer circumference of the free end of the tube 20 of the element 12 to hold the adjacent portion of the bung thereagainst. The lower run of the endless belt 36 frictionally engages the bung along its length starting just below the point of application of the suction and, when driven by the upper roller, drives the bung off the element 12 in such a manner that the portion of the bung below the suction-held portion progressively passes over this latter portion thereby to turn the bung inside out. The removed bung is then discharged via the discharge chute 40 and the transport unit completes its cycle to return each unloaded element 12 to the loading zone L for engagement thereon of a further bung.

If it is not desired to turn the bungs inside out during the removal procedure, the vacuum supply to the ports 17 may be withheld.

The machine thus enables a mechanised washing of animal casings such as bungs with manual operations being confined to initial cutting of the bungs and loading on the machine. The machine is able to handle washing of bungs of different kinds of animals and the treatment cycle time can be varied by appropriately adjusting the machine drives.

It is envisaged that counting means may be provided for counting bungs removed from the transport unit. The counting means may consist of, for example, a counting device arranged in association with the removal unit 35, so that the washed bungs can be counted immediately prior to removal from the elements 12.

It will be appreciated that the embodiment described in the foregoing is merely an example of the machine provided by the invention, and various features of the machine may be modified in both construction and operation without departing from the scope of the invention as defined in the appended claims.

What is claimed is:

1. A method of mechanically washing an animal casing such as a bung, said method comprising the steps of
   (a) placing the casing on an elongate support element so that said element extends through the interior of the casing, said element including means defining duct means for washing liquid and outlet means for the discharge of such liquid in the interior of the casing,
   (b) causing washing liquid to issue under pressure from said outlet means thereby to wash the interior of the casing, and
   (c) directing said washing liquid in the form of jets at an angle to the interior surface of the casing to rotate the casing around said element.

2. A method according to claim 1, comprising the further step of removing the casing from said element after being washed.

3. A method according to claim 2, wherein the removal of the casing from said element is carried out in such a manner as to turn the casing inside out.

4. A method according to claim 1, comprising the preliminary step of cutting the casing to a predetermined length prior to being placed on said element.

5. A method of continuously washing animal casings such as bungs, comprising the step of washing the casings in succession by the method according to claim 1, each casing being placed on a respective support element.

6. A method according to claim 5, wherein washing liquid is supplied to said duct means of said elements in succession.

7. A method according to claim 6, wherein the supplying of washing liquid is carried out by moving said elements in succession through a washing zone and supplying washing liquid to said duct means of each said element while in said zone.

8. A method according to claim 7, wherein said elements are moved on a circular path and the washing zone occupies a segment of that path.

9. A method according to claim 8, wherein the casings are placed on the elements in a segment of said path angularly spaced from the segment occupied by said washing zone.

10. A method according to claim 9, wherein the casings are placed on said elements while said elements are moving.

11. A method of mechanically washing an animal casing such as a bung, said method comprising the steps of
    (a) placing the casing on an elongate support element so that said element extends through the interior of the casing, said element including means defining duct means for washing liquid and outlet means for the discharge of such liquid in the interior of the casing,
    (b) causing washing liquid to issue under pressure from said outlet means thereby to wash the interior of the casing, and
    (c) removing the casing from said element after being washed by applying suction to an end portion of the casing to hold said portion stationary relative to said element and then drawing the rest of the casing over said held portion to turn the casing inside out during removal.

* * * * *